United States Patent [19]

Steiner et al.

[11] Patent Number: 4,818,549

[45] Date of Patent: Apr. 4, 1989

[54] PRESERVATIVE METHOD AND PRESERVED FRUIT OR VEGETABLE PRODUCT, USING CITRIC ACID, SODIUM AND CALCIUM CHLORIDE-CONTAINING PRESERVATIVE COMPOSITION

[75] Inventors: Ferdinand Steiner, Newtown; Thomas E. Rieth, Shelton, both of Conn.

[73] Assignee: Pepperidge Farm, Incorporated, Norwalk, Conn.

[21] Appl. No.: 938,461

[22] Filed: Dec. 5, 1986

[51] Int. Cl.⁴ .......................... A23B 7/10; A23B 7/16
[52] U.S. Cl. .................................... 426/267; 426/268; 426/270; 426/310; 426/541; 426/544; 426/546; 426/615
[58] Field of Search ............... 426/262, 267, 268, 310, 426/541, 544, 546

[56] References Cited

U.S. PATENT DOCUMENTS

| | | | |
|---|---|---|---|
| 2,004,354 | 6/1935 | Tierney | 426/268 X |
| 2,560,820 | 7/1951 | Recker | 426/310 X |
| 2,758,929 | 8/1956 | Toulmin, Jr. | 426/310 X |
| 3,356,509 | 12/1967 | Laval, Jr. | 426/310 |
| 3,398,001 | 8/1968 | Benson | 426/310 X |
| 3,754,938 | 8/1973 | Ponting | 99/154 |
| 4,011,348 | 3/1977 | Farrier et al. | 426/268 |
| 4,350,711 | 9/1972 | Kahn et al. | 426/102 |

OTHER PUBLICATIONS

"Handbook of Food Additives", Pub. The Chem. Rubber Co., Clev. Ohio, Ed. Thomas Furia, 1968.

Wm. Howlett Gardner, "Food Acidulants", Allied Chem. Co., Oct. 1966.

Goldberg, J. and Mayer, J., "The Use of Sulfites in Foods Continues to Draw Attention", The Philadelphia Inquirer, 9/21/86, p. 13-J.

"Danger in the Salad: How Additives Harm", Health and You, Blue Cross of Greater Philadelphia, Fall 1986, pp. 1-2.

Puzo, P., "Sulfite Labels Ordered on Alcoholic Beverages", The Philadelphia Inquirer, 10/1/86, p. 5-A.

Primary Examiner—Barry S. Richman
Assistant Examiner—Timothy M. McMahon
Attorney, Agent, or Firm—Albert L. Free

[57] ABSTRACT

Food pieces, such as cubed apples, the exposed pulp of which tends to discolor upon exposure to air, are treated with an acidic aqueous solution which is effective in maintaining the natural color of the exposed pulp and which comprises citric acid, calcium chloride, and sodium chloride, with the treatment of such apples being preferably practiced by means of novel apparatus which uses a screw conveyor which receives the pieces of food at its inlet end and moves them from its inlet end to its outlet end automatically while the treating solution is continuously injected into the conveyor to coat the food pieces. Injection of the treating solution is controlled in response to control signals derived from a gamma ray weigh scale which weighs the food pieces continuously as they pass through the conveyor, so that the amount of treating solution injected is maintained in predetermined proportion to the rate at which the food pieces pass through the conveyor.

10 Claims, 4 Drawing Sheets

4,818,549

PRESERVATIVE METHOD AND PRESERVED FRUIT OR VEGETABLE PRODUCT, USING CITRIC ACID, SODIUM AND CALCIUM CHLORIDE-CONTAINING PRESERVATIVE COMPOSITION

FIELD OF THE INVENTION

The present invention relates to treating food to deter or inhibit deterioration thereof. More specifically, the present invention relates to treating pulp-containing food to deter or inhibit deterioration of the pulp thereof, including, for example, deterring the tendency of the pulp to change color.

This invention will be described initially in connection with its applicability to the treatment of freshly cut pieces of peeled apples; however, as will be explained below, its use has wider applicability.

Apples are used in vast quantities in commercial food applications, including applications in which the apples are cored, peeled and sliced before they are combined with other ingredients into a mixture which is cooked. The preparation on a commercial or industrial scale of apple-containing pastries such as pies and strudel is an example of such an application.

The tendency of the natural, light or off-white color of a peeled or sliced apple to turn brown within a short time, for example, within 5 to 10 minutes after the pulp of the apple is exposed to the air, is the source of a problem in such commercial applications. Once the apple has turned brown, it retains its brown color which is apparent to the consumer in many of the types of products made from the apples, including cooked products. Experience has shown that consumers consider brands of food containing such brown-colored apples to be of poor quality and not worthy of repurchase. The texture of such brown-colored apples also tends to be less firm than that of naturally light-colored apples—a matter also recognized by consumers as being undesirable.

In an effort to satisfy consumer tastes, apple processors have sought to prevent or at least deter the tendency of apples to discolor—a task which experience has shown is not easy to accomplish in a consistently effective and economical way. In part, this is attributable to certain practices which are inherent in the industry. For example, it is common in the industry for apples to be cored, peeled, and sliced at one geographical site—usually close to where the apples are harvested and stored—and then shipped under refrigerated conditions to the many different places where bakeries and other food processors are located. From the time of the peeling and/or cutting of the apples to the time of processing, there are many situations in which relatively long periods of time elapse, for example, as much as a week or more. An effective apple-treating process usually deters for at least such periods of time the tendency of apples to brown.

In order to be considered effective, an apple-treating process must also have a number of other characteristics. Treatment must be safe and it must not alter the taste, texture, or appearance of the apples. It is highly preferable also that the treatment not in any way change the nature of the apple-containing food other than in a way which may be desired. In addition, the treatment should be such that the desired results are achieved consistently even when the process is practiced on a commercial scale. And it is desirable also that the process be economical.

The present invention relates to a process for treating sliced or peeled apples and other pulp-type agricultural products to preserve the natural color of the pulp thereof and includes within its scope an improved treating composition and improved system and apparatus for effecting such treatment.

REPORTED DEVELOPMENTS

For many years, freshly cut apples were treated with an acidic aqueous solution of sulfite in order to preserve their natural, light color. However, the use of sulfite in foods has recently come under attack in view of recent reports that a not insignificant number of people, particularly asthmatics, are allergic to sulfite-containing foods. Even before the issuance of such reports, it was recognized that a disadvantage of using sulfites to treat food is that the undesirable taste and odor of sulfur are on occasion imparted to the sulfite-treated food.

In view of the aforementioned problems stemming from the use of sulfite, efforts have been made to find other effective means for treating pulp-type plant foods to preserve their natural, light color.

One such effort is the subject of U.S. Pat. No. 3,754,938 to Ponting. This patent discloses that the natural color of peeled apple slices can be preserved by treating the apple slices with an aqueous solution of ascorbic acid, calcium chloride and sodium bicarbonate. Prefereably, the pH of the treating solution is maintained within a range of 7 to 9 during use. The patent discloses also that it is known to treat sliced apples with ascorbic acid alone and with calcium chloride alone. (For example, see U.S. Pat. No. 4,350,711 to Kahn which discloses the anti-browning treatment of apples and peaches with an aqueous solution of ascorbic acid. The use of an aqueous solution of sodium chloride or of ethylenediaminotetracetic acid is also disclosed for treating apple slices.) However, the Ponting patent discloses that the use of such treating agent by itself has but a slight effect on maintaining the desired quality of the apples. According to the disclosure of the patent, use of the combination of the aforementioned three compounds is required for effective treatment.

The treating solution disclosed in U.S. Pat. No. 4,011,348 to Farrier and Leavens is somewhat related to the type of solution disclosed in the aforementioned Ponting patent in that it comprises an aqueous solution of sodium ascorbate or of a mixture of sodium ascorbate and ascorbic acid. The patent discloses that the solution is maintained at a pH of about 4 to about 7.5 and that it preferably contains sodium chloride. The patent discloses the use of the treating solution to maintain the natural appearance of sliced apples, pears, peaches and carrots.

The aforementioned Farrier and Leavens patent describes the causes of discoloration of the pulp of plants in the following way. Compounds present in the plant tissue are oxidized by enzyme-catalyzed reactions to orthoquinones which polymerize to form dark-colored substances which are responsible for the brown color of the pulp. Examples of compounds in the plant tissue that are subject to being oxidized are catechol, caffeic acid, chlorogenic acid, and gallic acid. Polyphenoloxidase is mentioned as the enzyme catalyst. The patent discloses further that ascorbic acid is thought to deter browning by imparting to the treated substance a pH below that at which the activity of the aforementioned enzyme is highest. According to the disclosure of the patent, when ascorbic acid is used in amounts to accomplish this, the treated product acquires an undesirable taste. Another disadvantage of using ascorbic acid or ascorbates is that these materials are relatively expensive.

Accordingly, the present invention relates to a food-treating composition which can be used effectively and economically to treat sliced apples and other foods to deter the deterioration thereof and which is substantially free of materials which have adverse effects, for example, materials such as sulfite and ascorbate.

Another problem associated with the prior art techniques for preserving the quality of food which is subject to deterioration relates to the means by which the food is contacted with the composition which inhibits deterioration. By way of background, it is noted that, in many commercial applications, it is highly desirable to be able to apply the browning inhibitor not only with exactly the preferred proportion of ingredients, but also with a predetermined proportion of inhibitor to mass of apples without requiring human monitoring or control. This can be difficult to do in view of the large variations in the rate of processing of the cut apples. Batch processing by immersion of the cut apples in a bath has been found to be undesirable because the apples absorb the bath ingredients selectively, so that the relative proportions of the bath ingredients change with continued use. If a simple steady flow of inhibitor onto the apples is used, then changes in the rate of processing of the apples change the ratio of inhibitor to apples. This upsets the balance of ingredients in the formula or recipe for the final food product in which the apples are used. For example, if the human or mechanical source of the supply of untreated cut apples falls to a low level, use of the same amount of inhibitor can cause the proportion of inhibitor to apples to increase significantly, so that the final product has an excess of the inhibitor. On the other hand, if the rate of flow of cut apples increases significantly, then a deficiency of the treating ingredients can be expected.

Accordingly, the present invention relates also to an improved system and apparatus which can be used to apply automatically to cut apples an inhibitor with the correct relative proportion of ingredients and in the desired proportion to the cut apples, despite changes in the rate of processing of the cut apples.

SUMMARY OF THE INVENTION

One aspect of the present invention relates to a process of the type in which the light-colored pulp of a plant product is treated with an inhibitor which is effective in deterring the deterioration of the pulp, said inhibitor comprising citric acid, sodium chloride and calcium chloride.

Another aspect of the present invention relates to the provision of a food-treating composition which is effective in preserving the light color of the freshly exposed pulp of fruits or vegetables, said composition comprising an aqueous solution of about 2 to about 10 wt. % citric acid, about 2 to about 4 wt. % sodium chloride, and about 2 to about 4 wt. % calcium chloride.

One of the advantages of the present invention is that the ingredients comprising the treating composition are materials which are used commonly in formulating various types of food products which include the treated fruits or vegetables. In accordance with the present invention, the natural color of the pulp of the plant food can be maintained while avoiding the use in the food product of a material which would be considered foreign to the recipe of the food product. This avoids the risk of having the treating composition alter in an undesirable way the taste or other characteristic of the food product.

Another aspect of the present invention includes a food product comprising a treated, aged pulp-containing fruit or vegetable, the pulp of said fruit or vegetable being exposed and substantially free of brown coloration, and wherein said fruit or vegetable is substantially free of sulfur, sulfite and/or ascorbate.

In a preferred embodiment of the invention, the treating composition is applied to the exposed pulp of the plant food by using a conveyor means which receives pieces of the food at its inlet end and moves them from its inlet end to its outlet end automatically. Measuring means are provided which measure the mass of said pieces at a predetermined location in the conveyor means to produce control signals representative thereof. Injection means are also provided for controllably delivering the treating composition to the food pieces as they move along the conveyor means, together with control means which respond to the control signals to control the rate of delivery of the treating composition onto the food pieces, preferably in proportion to the mass of the pieces present at the injection means.

Preferably also, the conveyor means, upstream of the point of measurement of the mass of the food pieces, comprises an auger-type screw, assuring that the food pieces will reach the measuring station at a substantially constant rate. Downstream of the injection means, the conveyor means is preferably a paddle-type conveyor which tumbles and mixes the food pieces so that they are uniformly coated with the treating composition. The measuring means preferably comprises a gamma ray weigh scale, and the treating composition is preferably supplied to the food pieces by means of a metering pump having a controllable piston stroke length, the length of the stroke being controlled by the control means in response to changes in the mass of the food pieces at the measuring location. The treating composition is preferably projected inwardly of the conveyor against the food pieces from opposite sides of the conveyor, and the control means preferably comprises a small-programmed computer device which can be manually adjusted to set the ratio of injected treating composition to food pieces.

With such a system, the proportion of ingredients in the treating composition remains constant, and the proportion of treating composition to food pieces also remains constant at a selected ratio.

BRIEF DESCRIPTION OF THE FIGURES

Other features of the invention will be more readily understood from a consideration of the following description, taken with the accompanying drawings, in which.

DETAILED DESCRIPTION OF THE INVENTION

Figure 1:
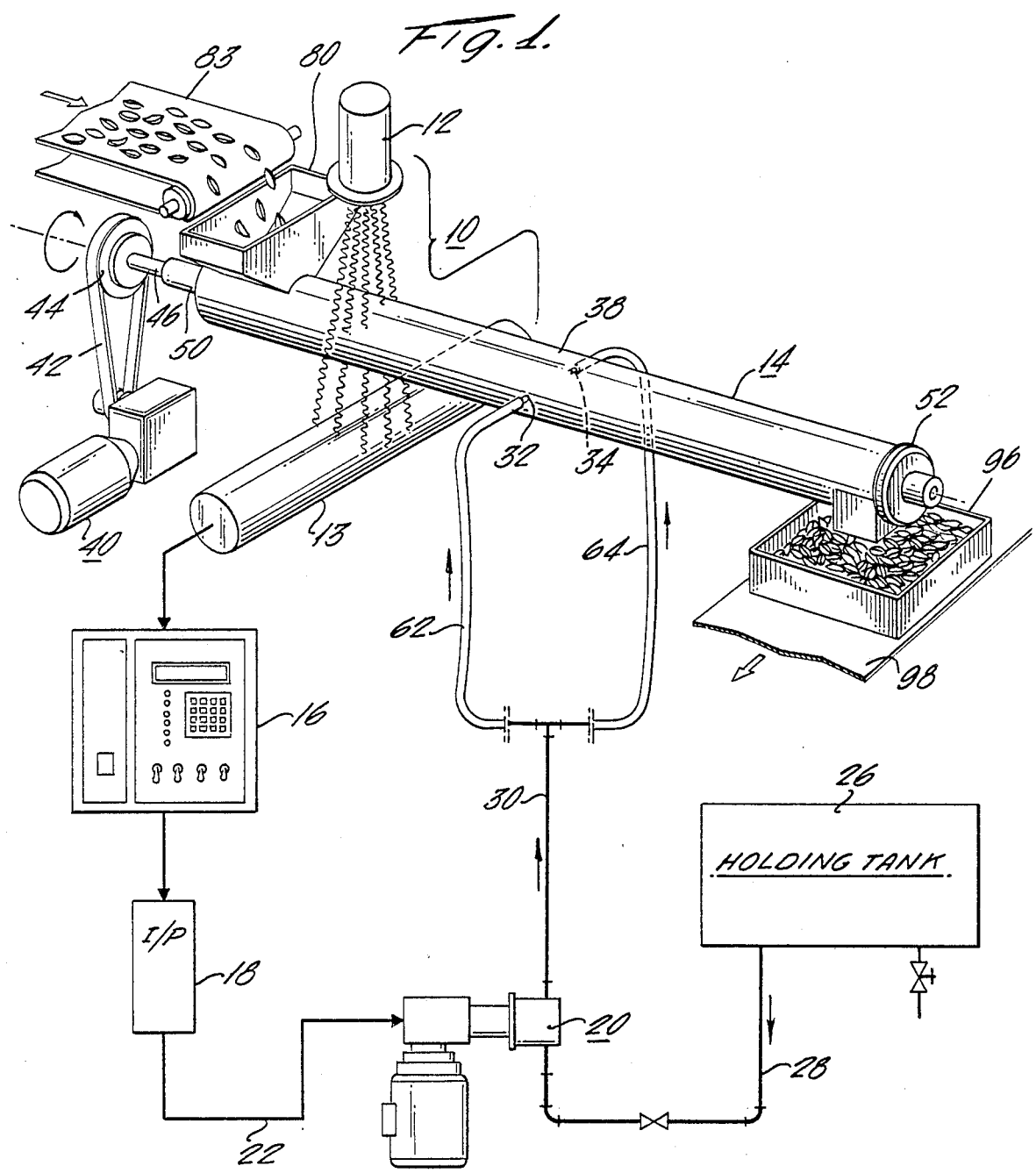
FIG. 1 is a schematic illustration of the overall conveyor system and its associated controls.
Figure 2:
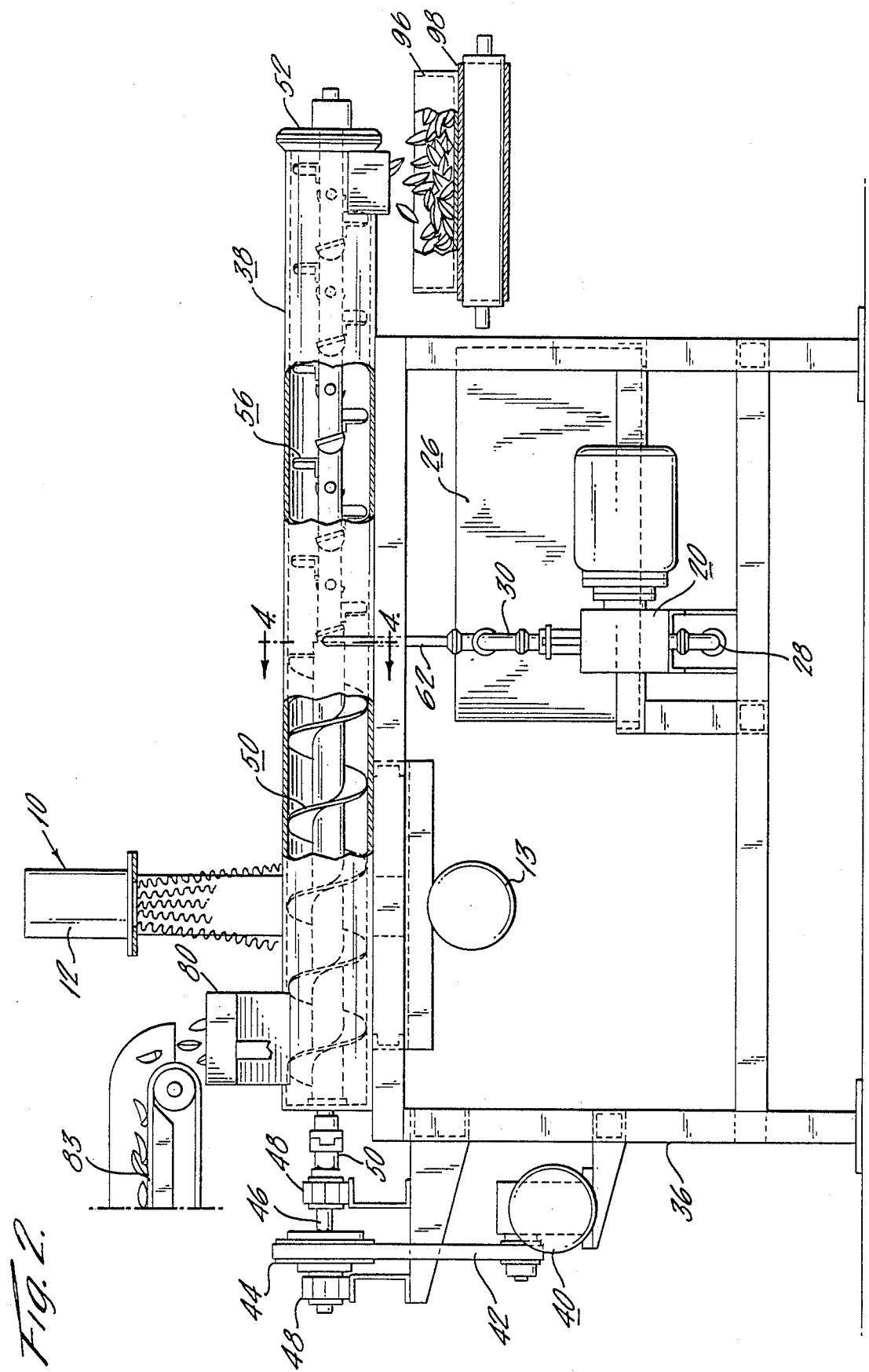
FIG. 2 is a side elevational view of the conveyor system illustrated in FIG. 1 showing details of construction with certain portions broken away for greater clarity.
Figure 3:
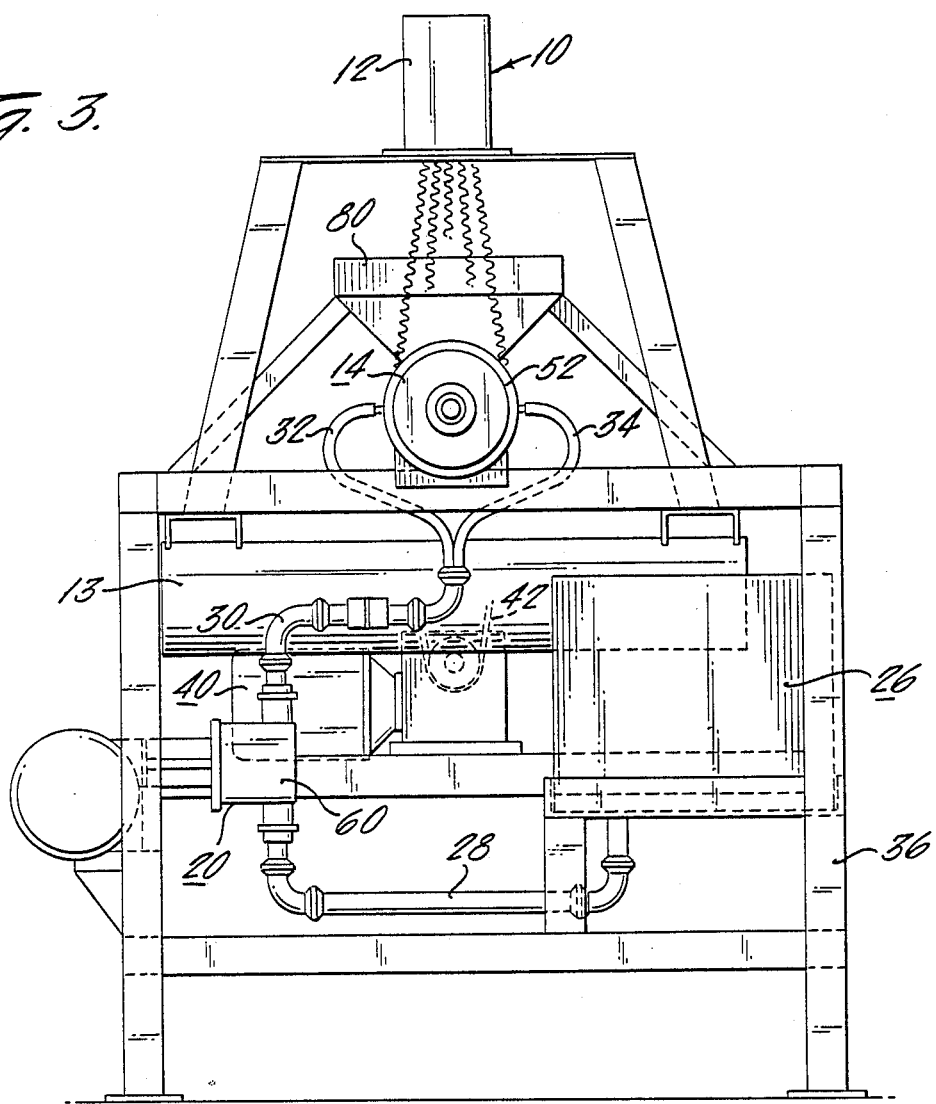
FIG. 3 is an end elevational view of the conveyor assembly shown in FIG. 2 as viewed from the right-hand side of FIG. 2.
Figure 4:
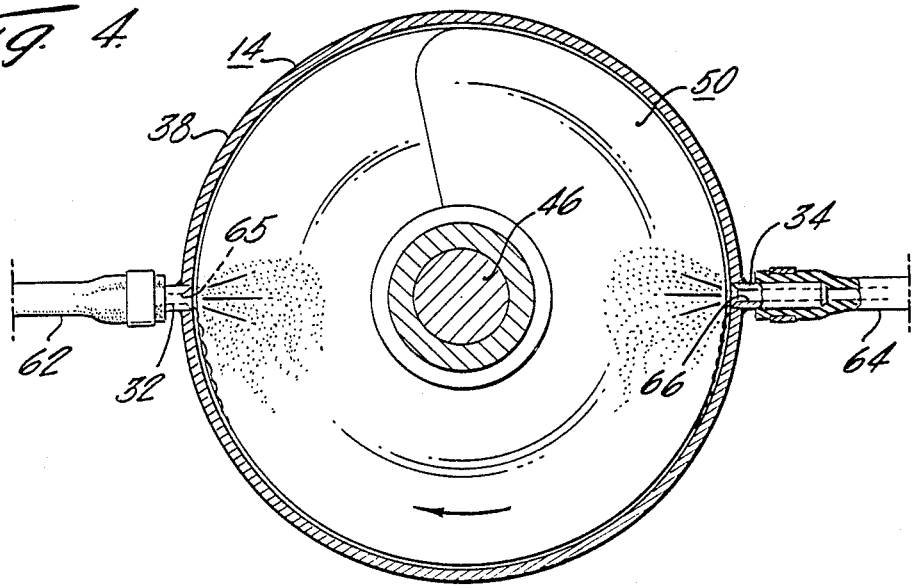
FIG. 4 is an enlarged fragmentary transverse sectional view taken on the line 4,4 of FIG. 2, showing details of construction at the injection station where the liquid treating composition is supplied to the interior of the conveyor tube.

The essential materials for treating food in accordance with the present invention to deter or inhibit deterioration thereof are citric acid, sodium chloride and calcium chloride. Each of these treating materials is a solid at room temperature and is available in powder form. Although each of these materials can be applied individually to the surface of the exposed pulp of the fruit or vegetable being treated, it is preferred that they be applied in the form of a mixture, most preferably in the form of an aqueous solution.

It is theorized, but not firmly established, that treatment of food such as apples in accordance with the present invention is effective in preserving the natural color thereof for the following reasons. It is believed that citric acid imparts to the surface of the exposed pulp of the fruit or vegetable a pH sufficiently low to render inactive the enzyme(s) thereof which is related to the tendency of the pulp to brown. It is believed also that calcium chloride helps to maintain the firmness of the pulp tissue by interacting with pectin in the cell walls of the treated food. And it is believed further that the action of the citric acid and calcium chloride is intensified by the use of sodium chloride. Comparative examples set forth below are evidence that a synergistic effect is realized by use of the treating constituents.

There is evidence from experimental work that the effects obtained by treating food in accordance with the present invention are reversible. For example, contact of the exposed pulp with the treating materials shows that browning of the pulp is deterred. However, work has shown that, if the treated pulp is washed with water so as to remove the treating materials, the pulp begins turning brown within 5 to 10 minutes after such washing. This reversible condition is in contrast to the irreversible condition which is experienced when treating the food with sulfite.

The materials should be applied to the exposed pulp of the fruit or vegetables in amounts which are effective to deter the deterioration thereof. The mere presence on the surface of the pulp appears to deter discoloration for at least some period of time, but for use in industry, the amounts of treating materials should be sufficient to deter discoloration for at least a 7-day period, preferably at least a 10-day period under conventionally used storage conditions. Such conditions typically comprise storing the treated food at a temperature within the range of about 32° F. to about 40° F., but not under conditions which freeze the food. Storing generally entails placing the treated food in an aerobic refrigerated environment.

The exposed pulp of the fruit or vegetable should be contacted with the treating materials prior to deterioration thereof and preferably promptly after the pulp is exposed, for example, within a few minutes after a peeling or cutting operation is effected.

In preferred form, the exposed pulp is treated with an aqueous solution comprising about 2 to about 10 wt. % citric acid, about 2 to about 4 wt. % sodium chloride and about 2 to about 4 wt. % calcium chloride. A particularly recommended solution comprises about 5 wt. % citric acid, and about 3 wt. % each of sodium chloride and calcium chloride. The pH of the solution is preferably within the range of about 1.25 to about 1.75, most preferably about 1.3 to 1.5.

It should be appreciated that amounts of treating materials outside of the aforementioned ranges can be used. Treatment with a solution containing lower amounts of materials produces a deterring effect on deterioration, but not as pronounced an effect. Treatment with a solution containing higher amounts of materials produces a deterring effect on deterioration, but this can be accompanied by an alteration of the food in an undesirable way and/or by a leveling off of the deterring effect.

Use of a preferred treating solution within the scope of the present invention offers several advantages. The amounts of treating materials deposited on the surface of the pulp by simply bringing the pulp into contact with the treating solution are sufficient to inhibit discoloration of the pulp for extended periods of time, for example, 7 or more days. In addition, the use of such solution can be readily controlled so that contact results in the deposit of treating materials in amounts which are basically equivalent to the amounts of such materials that would normally be incorporated into the recipe of the food product during its formulation.

The treating materials can be applied under any conditions which do not affect adversely the results which are desired. Satisfactory results are obtained conveniently at the ambient temperatures existing in a conventional plant, for example, temperature of about 65° F. to about 80° F.

The treating materials can be applied to the peeled or cut fruit or vegetable by any means of contact which results in the materials being deposited on the pulp thereof. For example, a liquid carrier of the treating materials can be applied to pieces of the food by the techniques of immersion or spray. However, the preferred form of application is described below in connection with the detailed description of the system and apparatus aspects of the present invention.

In a typical commercial process, the treated food will be stored under refrigerated conditions at temperatures of about 32° F. to about 40° F. for periods of time ranging from about 1 to 10 days. Such periods of time generally elapse from the time an order is placed by the food processor to the storer of the fruits or vegetables until the time they are peeled and/or cut and shipped to the food processor. In accordance with the present invention, there can be produced such "treated and aged" fruits or vegetables having exposed pulp which retains its natural color and resists browning for at least a 7-day period and which is substantially free of materials which would tend to affect adversly the taste, texture, or odor or other desired characteristics of the fruit or vegetable or the food product containing it. Examples of such materials are sulfur, sulfite and ascorbate, which, for example, derives from ascorbic acid or a salt thereof.

Although it is believed that the present invention will be used most widely in connection with the treatment of peeled and/or cut apples, it should be understood that the exposed pulp of other fruits and of vegetables can be treated also according to the present invention to inhibit or deter the deterioration thereof. Examples of the aforementioned are white and red potatoes.

There follows a description of the system and apparatus aspects of the present invention. A schematic diagram of the overall system is shown in FIG. 1. It comprises a gamma ray weigh scale 10 of conventional form employing a gamma ray source 12 and a gamma ray detector 13, separated from each other by a space through which the apple conveyor 14 extends. The programmed computer device 16 of the gamma ray weigh scale converts the detected gamma rays into an output current, which in this example can vary between 4 and 20 milliamperes depending upon the strength of the detected radiations and hence upon the mass of apples present in the detector zone. It is preferred to use as the gamma weigh scale a Kay-Ray Model 6000X digital weigh scale, made by Kay-Ray Inc., of Arlington Heights, Ill. In this form, the computer device may comprise various convenient displays and control switches, suggested in the drawing, which are not essential to the present invention.

The current output of the computer device 16 is supplied to a current-to-pressure (I/P) converter 18, also of conventional commercially-available form, which converts the 4–20 milliamperes control signal to a 3–15 PSI control signal for application to the metering pump 20. The metering pump may also be of a conventional commercially-available device such as that made by Bran & Lubbe Corporation of Wheeling, Ill. The metering pump responds to the control pressure variations supplied to its input on line 22 to vary its piston stroke correspondingly, over a range such that when no cut apples are detected in the conveyor the metering pump produces zero liquid output and, with increasing cut-apple content in the conveyor, the stroke of the pump increases to increase its liquid output correspondingly.

A holding tank 26 is provided in which the above-described liquid treating compositions is contained; a conduit pipe 28 supplies the composition to the metering pump 20, which as described above, produces a flow of the latter substance in its output line 30 in proportion to the amount of cut apples present in the conveyor. The latter output line branches and extends to a pair of output orifice devices 32 and 34, located on each side of the conveyor means downstream of the measurement device, and it is through these that the liquid treating composition is projected inwardly of the conveyor means onto the cut surfaces of the apples.

The preferred mechanical form of the system is shown in FIGS. 2–7. A table 36 supports a conveyor tube 38 and a gamma ray weigh scale 10 made up of the gamma ray source 12 and the gamma ray detector 13, the latter two of which are positioned respectively above and below the conveyor tube. The conveyor is driven by a motor and worm gear drive 40, through a timing belt 42 acting on sprocket wheel 44. The axle 46 for the sprocket wheel is supported at one end in appropriate pillow blocks 48 and connected to the conveyor axle by a suitable coupling 50. The opposite end of the conveyor axle is supported in an appropriate bearing 52. A discharge chute 53 at the bottom of the downstream end of the conveyor tube 38 permits the cut apples to flow out of the conveyor tube as desired. The initial upstream portion of the conveyor comprises an auger 50 fitting closely against the interior of conveyor tube 38, while the downstream portion of the conveyor comprises a paddle-type conveyor 56.

The holding tank 26 supplies the liquid treating composition to the metering pump chamber 60 (FIG. 3) by way of conduit pipe 28. The output from chamber 60 supplies the composition through conduit 30, and through the branched pair of flexible conduits 62 and 64, to the outlet orifices 32 and 34, which are located in opposed openings 65,66 in the wall of the conveyor and are directed radially inwardly; these orifices may typically have a diameter of the order of ⅛".

While an auger fitting closely against the outer case of the screw conveyor could be used downstream of the weigh scale device, and downstream of the injection station at which the liquid treating composition is injected, it is preferred to use paddle-type impellers downstream of the injection station to produce random tumbling of the apples and a wiping of them against each other and the interior surface of the conveyor tube 38.

Figure 5:
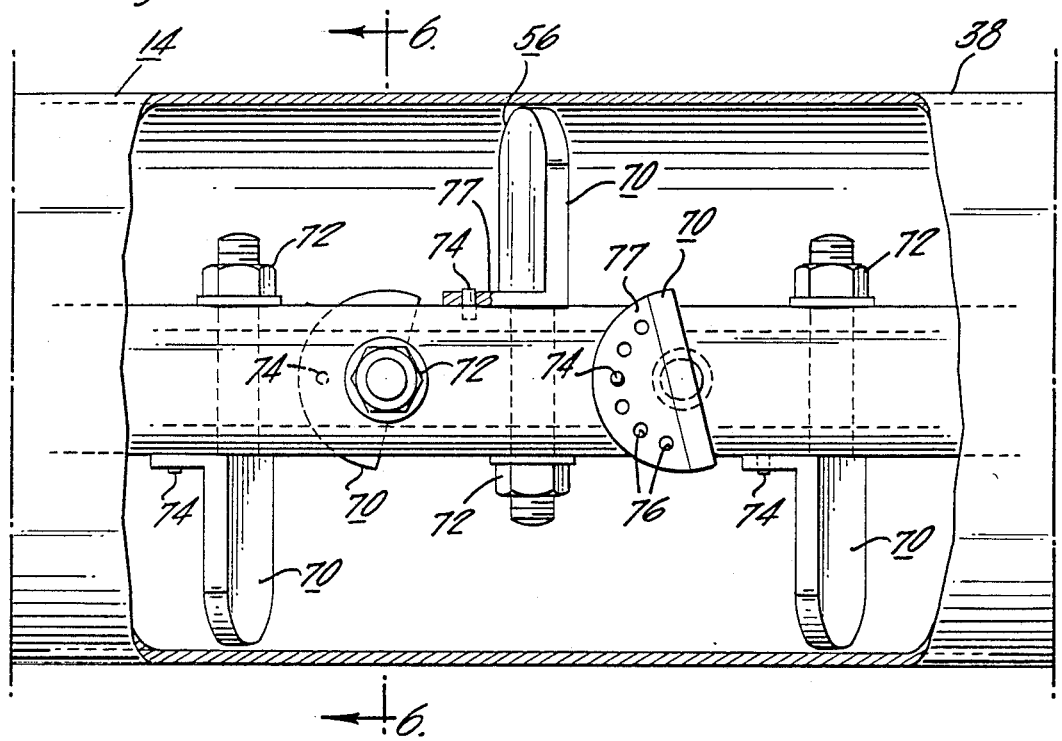
FIG. 5 is a fragmentary enlarged sectional view of a portion of the paddle conveyor showing details of construction.
Figure 6:
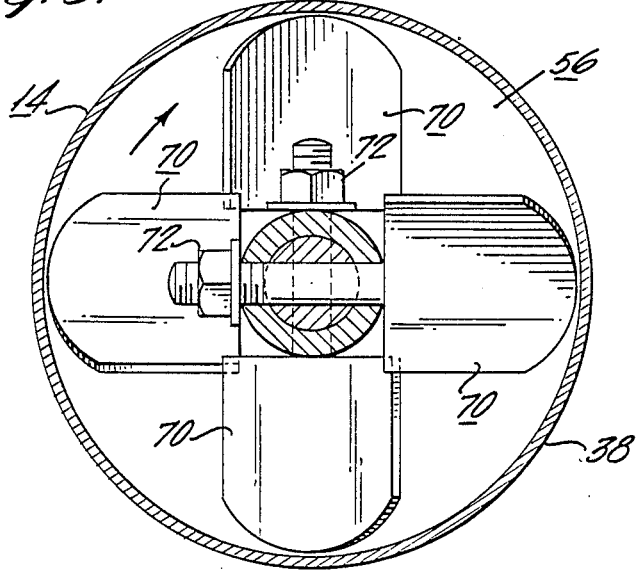
FIG. 6 is a transverse sectional view taken on the line 6,6 of FIG. 5.
Figure 7:
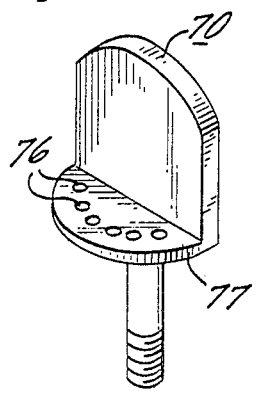
FIG. 7 is an isometric view of one of the paddle blades utilized in the paddle portion of the conveyor.

Such paddle structure is shown in FIGS. 5 and 7, wherein 70 is a typical paddle element, secured to the conveyor shaft by nut-and-bolt arrangement 72. The angular position of each paddle is set by locating a corresponding respective pin such as 74 in a selected one of a row of holes 76 in an arcuate flange 77 on the paddle, before tightening the nut and bolt. Successive paddles are preferably oriented 90° further around the conveyor drive shaft, as shown. The angle of the paddles with respect to the axes of the conveyor axle may be set to provide the desired extent of mixing effect.

In operation, the cut apples are fed into the inlet hopper 80 (FIG. 1), as from an input conveyor 83, whence they fall into the inlet end of the main conveyor and are conveyed first past the gamma ray weigh scale 10, where the mass of the apples in the field of the weigh scale is sensed, and then past the orifices at the injection station where the liquid treating composition is injected into the conveyor and against the cut apples, at a rate substantially proportional to the mass of cut apples adjacent the injector, as earlier detected by the gamma ray weigh scale.

Preferably, the mass detector system is first zeroed by operating it with no cut apples present in the system, to establish a zero level; the presence of the apples as they are later conveyed through the conveyor then causes a decrease in detected gamma rays which is a measure of the mass of cut apples in the conveyor tube at the weigh scale location. In this way, the effect of the tare weight of the conveyor, which otherwise would affect the output of the detector system, is cancelled.

It is noted that the diameter of the stream of composition projected into the conveyor from the two orifices is preferably such, with relation to the flight length of the auger, that all cut surfaces of the apples will be substantially equally exposed to the composition; this relatively even coating of the apple surfaces is enhanced by the tumbling action produced by the paddle conveyor.

It is noted that the mass of apples at the injector station is that which was previously measured by the gamma ray weigh scale upstream of the injector station. In order that injection shall be controlled in accordance with the mass of apples actually present at the injector station, the measurement of apple mass at the weigh scale is stored by the computer program in device 16 until the apples whose mass has been measured reach the injection station; in one typical case, this delay was about 3 seconds, equal to the distance between weigh scale and injection station divided by the speed of advance of the apples in the conveyor.

The surface treated apples are collected in a plastic-lined box 96, which may be one of a series of boxes on an output conveyor 98; the lined box retains any excess treating composition which may drip from the output end of the apple conveyor, so that the desired ratio of inhibitor to apples is maintained in the collection box 98. The box and contents are preferably refrigerated, at a temperature above freezing, until used later to make the final food product.

In a typical embodiment of this apparatus, cut (e.g. sliced or diced) apples may be fed through the conveyor at mass rates of from about 1500 to about 5000 lb/hour; at a typical rate of about 4750 lb/hour, the rate of liquid treating composition dispensing is typically about 4.17 lb per minute, with the paddles at the same angle as the screw flights and using a screw having a 6' pitch and approximately a 6' diameter. For product flow rates higher than 3000 lb/hr, it may be desirable to reduce the paddle angle to provide sufficient retention time of product in the mixing region for proper coating of the food product.

EXAMPLES

Examples which follow are illustrative of the practice of the present invention. Comparative examples are set forth also.

Various aqueous treating solutions, as described in Table 1 below, were prepared. Twenty-five grams of each treating solution were applied to peeled ½-inch cubed Golden Delicious apples. The cubed apples weighed 500 g. The solution was applied to the apples by placing them in a polyethylene bag, adding the solution to the bag, and tumbling the apples around inside the bag until all exposed surfaces were coated with solution. The bag containing the cubed, treated apples was placed on a flat tray and the apples distributed in a single layer. The open end of the bag was folded under itself. The tray containing the bagged apples was placed in aerobic storage in a refrigerator maintained at 32°–40° F. The apples were observed daily and visual changes in color from the natural cream color of the freshly cut apples were recorded. The term "slightly brown" which appears in Table 1 below means that the surface of the cubed apples appeared light brown in color and darker than the surface of the freshly cubed apples. The term "brown" which appears also in Table 1 below means that cubed apples were distinctly browner in color than apples which were "slightly brown". The results of the evaluation are shown in Table 1 below.

TABLE 1

| | Aqueous Treating Solution | | Test Results |
|---|---|---|---|
| Example No. | Ingredients - 3.1 wt. % each of NaCl & CaCl$_2$ and Indicated Amount of Citric Acid, wt. % | pH | Day After Treatment on Which Browning Was Observed & Degree of Browning of Apples |
| C-1 | 0 | 6.25 | day 7, brown |
| 1 | 2 | 1.71 | day 7, slightly brown, day 11, brown |
| 2 | 4 | 1.50 | day 13, slightly brown and spots on surfaces of apples |
| 3 | 6 | 1.39 | day 13, slightly brown and spots on surfaces of apples |
| 4 | 8 | 1.29 | no browning through 14 days |

TABLE 1-continued

| | Aqueous Treating Solution | | Test Results |
|---|---|---|---|
| Example No. | Ingredients - 3.1 wt. % each of NaCl & CaCl$_2$ and Indicated Amount of Citric Acid, wt. % | pH | Day After Treatment on Which Browning Was Observed & Degree of Browning of Apples |
| 5 | 10 | 1.23 | no browning through 14 days |

From the results reported in Table 1 above, it can be seen that the use of increased amounts of citric acid led to improved results, with the improvement leveling off in the 8 to 10 wt% range as respects a fourteen-day storage period.

The next group of examples includes the use of comparative examples and an example of the present invention. The six aqueous treating solutions described in Table 2 below were prepared. They were used to treat Golden Delicious apples in the same manner as described previously for the first group of examples. The results of the treatment are shown in Table 2 below.

TABLE 2

| | Aqueous Treating Solution | | Test Results Day After Treatment on Which Browning was Observed and Degrees of Browning of Apples |
|---|---|---|---|
| Example No. | Ingredients | pH | |
| C-2 | 3.1 wt % NaCl | 6.2 | day 1, slightly brown day 2, brown day 8, darker brown |
| C-3 | 3.1 wt % CaCl$_2$ | 8.0 | day 2, slightly brown day 3, brown day 6, slightly brown day 8, brown |
| C-4 | 3.1 wt % NaCl & 3.1 wt % CaCL$_2$ | 7.9 | day 3, slightly brown day 8, brown |
| C-5 | 3.1 wt % NaCl & 2 wt % citric acid | 2.08 | day 1, slightly brown day 3, brown day 8, darker brown |
| C-6 | 3.1 wt % NaCl & 2 wt % citric acid | 1.73 | day 3, slightly brown day 8, brown |
| 6 | 3.1 wt % CaCl$_2$ 3.1 wt % NaCl, & 2 wt % Citric acid | 1.65 | day 9, slightly brown |

The examples of Table 2 above show clearly that the most effective results are achieved using the treating solution of the present invention.

The next group of examples illustrates the effect of varying the concentration of citric acid in treating solutions which are comparative in nature. Aqueous treating solutions described in Table 3 below were prepared. Golden Delicious apples were treated in the manner described above in connection with the first group of examples. The results of the evaluation are in Table 3 below.

TABLE 3

| | Aqueous Treating Solution | | Test Results |
|---|---|---|---|
| Example No. | Amount of Citric Acid, wt. % | pH | Day after Treatment on Which Browning was Observed and Degree of Browning of Apples |
| C-7 | 0 | 7.1 | day 3, brown |
| C-8 | 2 | 2.20 | day 3, brown |
| C-9 | 4 | 2.02 | day 3, brown |
| C-10 | 6 | 1.90 | day 3, brown |
| C-11 | 8 | 1.82 | day 3, brown |
| C-12 | 10 | 1.74 | day 3, brown |

The examples in Table 3 above show that the use of even relatively large amounts of citric acid does not deter the browning of apples beyond a two-day period.

The next group of examples shows the use of aqueous treating solutions containing a fixed amount of sodium chloride and varying concentrations of citric acid. The aqueous treating solutions described in Table 4 below were prepared and applied to Golden Delicious apples in the manner described previously in connection with the first group of examples. The results of the evaluation are shown in Table 4 below.

TABLE 4

| | Aqueous Treating Solution | | Test Results |
|---|---|---|---|
| Ex. No. | Ingredients - 3.1 wt % NaCl and Indicated Amount of Citric Acid, wt. % | pH | Day After Treatment on Which Browning was Observed and Degree of Browning of Apples |
| C-13 | 8 | 1.60 | day 7, slightly brown |
| C-14 | 10 | 1.52 | day 11, slightly brown |

A comparison of Examples C-13 and C-14 in Table 4 above with Example 6 in Table 2 above shows that when using an NaCl/citric acid solution, relatively large amounts of citric acid are needed for effective treatment relative to the use of an NaCl/CaCl$_2$/ citric acid solution.

The next group of examples shows the effect of employing aqueous solutions containing varying amounts of CaCl$_2$ to treat Golden Deilicous apples. Table 5 below includes a description of the treating solutions and the results obtained after use thereof to treat apples in the manner described above in connection with the first group of examples.

TABLE 5

| | Aqueous Treating Solution | | Test Results Day After Treatment on Which Browning was Observed and Degree of Browning of Apples |
|---|---|---|---|
| Ex. No. | Amount of CaCl$_2$, Wt. % | pH | |
| C-15 | 0 | 7.2 | day 1, brown |
| C-16 | 0.1 | 7.9 | day 1, brown |
| C-17 | 0.5 | 7.85 | day 1, brown |
| C-18 | 1.0 | 7.85 | day 1, brown |
| C-19 | 2.0 | 7.8 | day 1, slightly brown day 2, brown |
| C-20 | 4.0 | 7.7 | day 2, slightly brown day 5, brown* |
| C-21 | 6.0 | 7.7 | day 5, brown* |

*The apples were not observed on the third and fourth days.

The examples in Table 5 above show that the use of even relatively large amounts of calcium chloride does not deter to any significant extent the tendency of apples to turn brown.

The next group of examples is similar to the group reported in Table 1 above, but shows the treatment of cubed Northern Spy apples instead of cubed Golden Delicious apples. The Northern Spy apples had been stored for more than 10 months prior to their treatment. The results of the evaluation are shown in Table 6 below.

TABLE 6

| Aqueous Treating Solution | | Test Results |
|---|---|---|
| Ex. No. | Ingredients - 3.1 wt % each of NaCl & CaCl$_2$ and Indicated Amount of Citric Acid, wt % | Day After Treatment on Which Browning Was Observed & Degree of Browning |
| C-22 | No treating solution | day 1, brown |

TABLE 6-continued

| Aqueous Treating Solution | | Test Results |
|---|---|---|
| Ex. No. | Ingredients - 3.1 wt % each of NaCl & CaCl$_2$ and Indicated Amount of Citric Acid, wt % | Day After Treatment on Which Browning Was Observed & Degree of Browning |
| | applied | day 16, brown, soft fruit |
| C-23 | 0 | day 2, slight discoloration day 5, slightly brown day 16, slightly brown, firm fruit day 22, slightly brown |
| 7 | 2 | day 5, off white day 22, very slightly brown |
| 8 | 4 | day 22, brown spots |
| 9 | 6 | day 22, brown spots |
| 10 | 8 | day 22, brown spots |
| 11 | 10 | day 22, brown spots |

From test results reported above, including the results reported in Table 6 above, it can be seen that the present invention can be used effectively to treat different types of apples.

The next group of examples illustrates the use of the present invention to treat apples in sliced form in contrast to the cubed form which is the subject of previous examples. Northern spy apples of the type referred to above were used in these examples. Each of the aqueous treating solutions described in Table 7 below was used to treat an apple sample which weighed about 475 g. because the exposed surface area of the sliced apples was about 72% of the surface area of the cubed apples, the quantity of treating solution applied to each apple sample was reduced proportionately and consisted of about 18 g. The term "off white" used in Table 7 means darker than the natural cream color of freshly sliced apples, but not as dark as apples which were "slightly brown".

TABLE 7

| Aqueous Treating Solution | | Test Results |
|---|---|---|
| Ex. No. | Ingredients - 3.1 wt % each of NaCl & CaCl$_2$ and Indicated Amount of Citric Acid, wt % | Day After Treatment on Which Browning Was Observed & Degree of Browning |
| C-24 | No treating solution applied | day 1, brown day 22, brown |
| C-25 | 0 | day 4, slightly brown day 22, uniform slightly brown |
| 12 | 2 | day 4, off white day 22, uniform, slightly brown, darker than C-24 |
| 13 | 4 | no browning through 15 days, day 22, uniform, slightly brown, darker than Ex. 12 |
| 14 | 6 | no browning through 15 days day 22, dark brown, speckles |
| 15 | 8 | no browning through 15 days day 22, more dark brown speckles than Ex. 14 |
| 16 | 10 | no browning through 15 days day 22, very speckled |

From the results reported in Table 7 above, it can be seen that the present invention can be used effectively to treat relatively large pieces of cut food.

The next group of examples illustrates the effect of varying the amount of treating solution applied to an apple sample which weighed 475 g and which consists of ⅜" cubed Northern Spy apples of the type mentioned above. The aqueous treating solution contained 5 wt. % citric acid, 3.1 wt. % NaCl and 3.1 wt. % CaCl₂. The treated apples were stored between 38° C. and 40° F. before they were evaluated. The results of the evaluation of the apples are reported in Table 8 below.

TABLE 8

| Example No. | Amount of Aqueous Treating Solution | Test Results |
|---|---|---|
| 17 | 25 grams | no browning through 12 days yeasty in taste and slightly soft texture |
| 18 | 12.5 grams | day 2, off white day 3, very slightly brown |
| C-26 | no treating solution applied | day 1, brown, also brown after 3 hours |

Calculations show that the 25 and 12.5 grams of treating solutions used in the examples of Table 8 correspond respectively to about 5 wt. % and 2½wt. % of the amount of treated apple samples. Although larger proportions of treating solution can be used, satisfactory results have been obtained utilizing amounts which correspond to about 5 wt. % of the treated food sample when treating a sample which has a relatively large surface area, as is the case, for example, in treating diced or cubed forms of food.

It can be seen from the examples reported in Table 7 above that smaller proportions of treating solution can be used effectively when treating a food sample that has a relatively small surface area, as is the case, for example, in treating sliced forms of food. In this connection, it can be seen that an amount of treating solution corresponding to about 3.7 wt. % of the treated sliced apples which are the subject of the examples reported in Table 7 was effective.

In view of differences in foods and in forms of food that can be treated in accordance with the present invention, it is recommended that the "more" effective amount of treating solution for use in any particular application be determined empirically. The test results reported herein can be used as a guide to the selection of the amounts selected for such empirical determinations.

The next group of examples relates to evaluations like those reported in Table 8 above except that the treated apples were stored at a temperature of about 70° F. The results of evaluation of the apples are reported in Table 9 below.

TABLE 9

| Example No. | Amount of Aqueous Treating Solution | Test Results |
|---|---|---|
| 19 | 24 grams | day 1, off white day 5, yellow day 12, moldy |
| 20 | 12 grams | day 1, slightly brown, day 3, brown day 12, moldy |
| C-27 | no treating solution applied | day 1, brown, also brown after 3 hours day 3, dark brown |

TABLE 9-continued

| Example No. | Amount of Aqueous Treating Solution | Test Results |
|---|---|---|
|  |  | day 5, very dark brown, moldy |

Comparison of the results in Tables 8 and 9 above show improvements that are realized when the treated apples are stored at a chilled temperature.

The next group of examples shows the use of the present invention to effectively treat potatoes. The samples treated were red potatoes and white potatoes, each sample weighing 500 g and being in ½" cubed form. Each of the samples was treated with about 25 g of aqueous treating solution comprising 5 wt. % citric acid, 3.1 wt. % NaCl and 3.1 wt. % CaCl₂. The solution was applied to the potatoes as previously described in the first group of examples. The treated potatoes were then stored at 35° to 40° F. The results are reported in Table 10 below.

TABLE 10

| Example No. | Potato Type | Test Results |
|---|---|---|
| 21 | red | no browning through 7 days |
| 22 | white | no browning through 7 days |

The results in Table 10 show the effectiveness of the invention in treating other types of foods.

In summary, it can be stated that the present invention provides a sulfite-free composition for treating foods to deter discoloration of the pulp thereof in a manner such that the desired taste and texture of the foods are not affected adversely. In addition, the present invention provides the means for effecting such treatment in a practical and economical way.

We claim:

1. In a process in which the light-colored pulp of a plant product is contacted with a composition which is effective in deterring the deterioration of the pulp, the improvement wherein the composition comprises an aqueous solution of citric acid, sodium chloride and calcium chloride in an amount effective to deter for at least 7 days the browning of said pulp stored at a nonfreezing temperature within the range of about 32° F. to about 42° F.

2. A process according to claim 1 wherein said plant product is pieces of peeled and sliced apples which are treated with said aqueous solution of citric acid, sodium chloride and calcium chloride in an amount effective to maintain the natural color of said pulp and deter it from browning.

3. A fruit or vegetable having exposed light-colored pulp and having the tendency to brown within minutes after exposure to air, wherein said exposed pulp has been contacted with a browning-inhibiting aqueous solution of citric acid, sodium chloride and calcium chloride, which, upon storage, retains its natural color and resists browning for at least a 7-day period and which is substantially free of sulfur, and sulfite and ascorbate salts.

4. A fruit or vegetable according to claim 3, wherein said fruit or vegetable comprises apple slices.

5. A food product comprising a fruit or vegetable according to claim 3 further comprising other edible ingredients.

6. A food product according to claim 5 which includes apples which have been contacted with citric acid, sodium chloride and calcium chloride.

7. The method of inhibiting the browning of light-colored exposed pulp pieces of fruit or vegetables having a tendency to brown within minutes after exposure to air comprising:
  (a) exposing light-colored pulp of fruit or vegetable pieces;
  (b) immediately after said exposure, moving continuously said exposed pump pieces past a location where said pieces are contacted with a treating composition consisting essentially of an acidic aqueous solution of citric acid, sodium chloride and calcium chloride;
  (c) tumbling said pieces as they move past said location; and
  (d) recovering said pieces after being contacted with said treating composition.

8. The method of claim 7, wherein said composition consists essentially of an acidic aqueous solution of about 2 to about 10 wt. % of citric acid, about 2 to about 4 wt. % of sodium chloride and about 2 to about 4 wt. % of calcium chloride.

9. The method of making a composite food product containing predetermined amounts of cut apples and other edible ingredients comprising:

cutting said apples to the form desired in said food product;
while the exposed pulp of said cut apples still retains its original light color, forming a stream of said cut apples, dispensing a flow of a browning-inhibiting material onto said apples, and forming a coating on said apple pulp of said material consisting essentially of citric acid, NaCl and $CaCl_2$;
collecting said coated apples and storing them for a time which in the absence of said coating would cause undesirable browning of said exposed pulp;
thereafter forming said food product using said coated apples as the source of said predetermined amounts of cut apples and said edible ingredients.

10. In a cut or peeled fruit or vegetable having exposed light-colored pulp which tends to brown within minutes after exposure to air and which has been contacted with a browning-inhibiting composition, the improvement wherein the composition comprises an aqueous acidic solution comprising citric acid, sodium chloride and calcium chloride and having a pH within the range of about 1.25 to about 1.75, which retains its natural color and resists browning for at least a 7-day period upon storage at a non-freezing temperature within the range of about 32° F. to about 42° F. and which is substantially free of sulfur, and sulfite and ascorbate salts.

* * * * *